United States Patent
Brunetti et al.

(10) Patent No.: US 6,821,022 B2
(45) Date of Patent: Nov. 23, 2004

(54) HUB AND BREAK ROTOR ASSEMBLY FOR A VEHICLE WHEEL

(75) Inventors: Marco Brunetti, Turin (IT); Andrea Griseri, Turin (IT)

(73) Assignee: SKF Industrie S.p.A., Turin (IT)

(*) Notice: Subject to any disclaimer, the term of this patent is extended or adjusted under 35 U.S.C. 154(b) by 10 days.

(21) Appl. No.: 10/267,626

(22) Filed: Oct. 8, 2002

(65) Prior Publication Data

US 2003/0068109 A1 Apr. 10, 2003

(30) Foreign Application Priority Data

Oct. 10, 2001 (IT) ..................................... TO20010188 U

(51) Int. Cl.[7] .............................................. F16C 35/00
(52) U.S. Cl. ...................................... 384/544; 384/589
(58) Field of Search ................................ 384/544, 589; 188/18 A, 218 XL; 301/105.1

(56) References Cited

U.S. PATENT DOCUMENTS

| | | | | |
|---|---|---|---|---|
| 5,988,324 A | * | 11/1999 | Bertetti et al. ............ | 188/18 A |
| 6,033,032 A | * | 3/2000 | Rutter ........................ | 301/6.1 |
| 6,145,632 A | * | 11/2000 | Rutter ........................ | 188/18 R |
| 6,170,919 B1 | * | 1/2001 | Hofmann et al. ......... | 301/105.1 |
| 6,322,253 B1 | * | 11/2001 | Picca ......................... | 384/513 |
| 2002/0015545 A1 | | 2/2002 | Griseri et al. | |

FOREIGN PATENT DOCUMENTS

| | | |
|---|---|---|
| EP | 0 783 980 | 11/1996 |
| EP | 0 851 140 | 7/1998 |
| FR | 2 810 382 | 12/2001 |

* cited by examiner

*Primary Examiner*—Thomas R. Hannon
(74) *Attorney, Agent, or Firm*—Merchant & Gould P.C.

(57) ABSTRACT

A wheel assembly includes a hub and bearing unit in which an annular hub has an axial cylindrical seat with an outer ring of a bearing fitted thereto with radial interference. The ring is locked axially on the hub between a pair of annular rims which project radially outwardly from the outer cylindrical surface of the ring and have been cold-deformed so as to engage two opposite surfaces of the hub. The hub also has an outer radial flange for fixing a brake rotor which in turn has an inner radial flange arranged substantially in the same plane as the flange. The brake rotor is locked axially on the hub by at least one cold-deformed annular rim which projects radially outwardly from the flange on the hub so as to engage a respective one of two radial surfaces of the flange.

9 Claims, 2 Drawing Sheets

Figure 3:
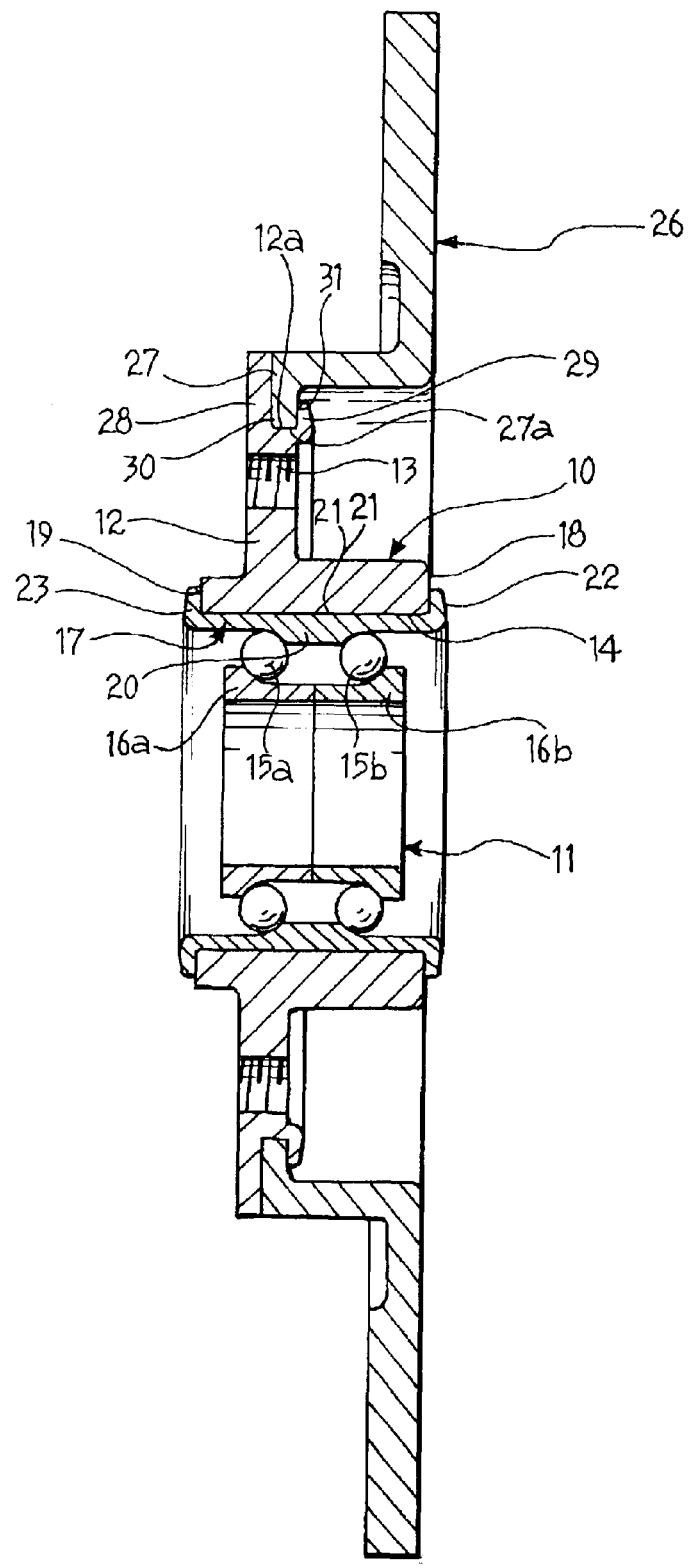

FIG. 1
(PRIOR ART)
FIG. 2
(PRIOR ART)
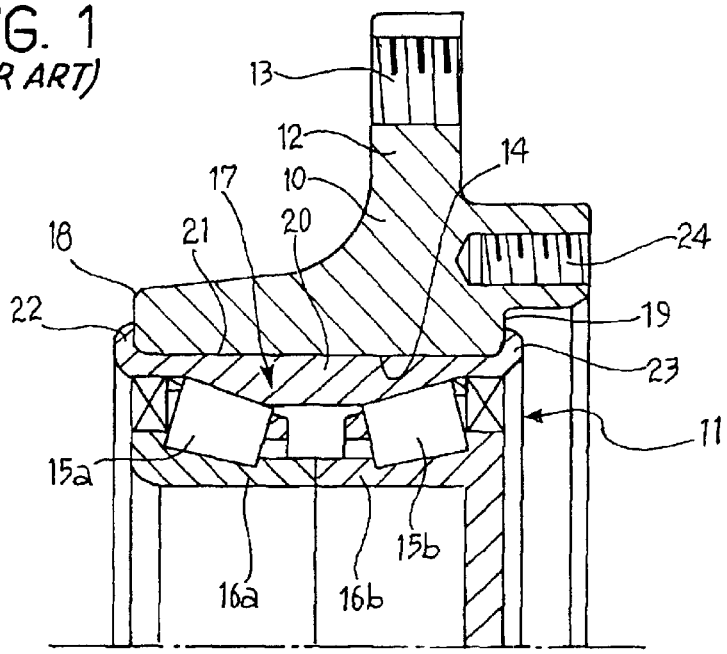
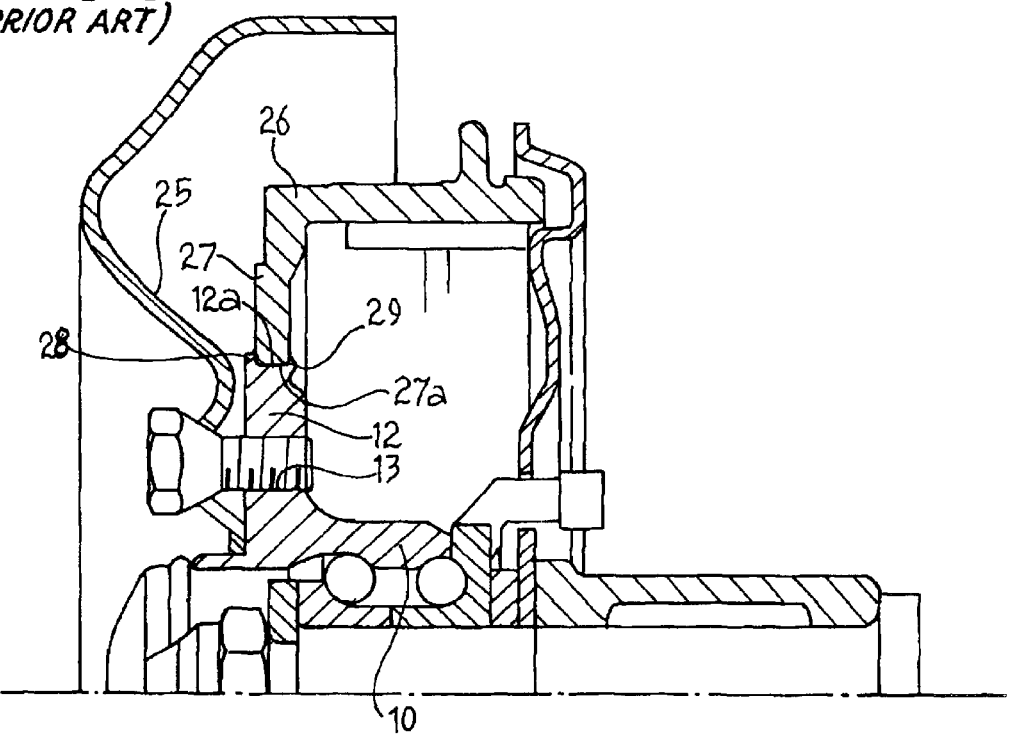

HUB AND BREAK ROTOR ASSEMBLY FOR A VEHICLE WHEEL

DESCRIPTION

The present invention relates to a hub and brake rotor assembly for a vehicle wheel, of a type including a so-called first generation hub and bearing unit and a brake rotor, such as a disc or a drum, connected to the hub so as to be rotatable therewith, as specified in claim 1.

An assembly of the type indicated above is described in U.S. patent application published under No. US 2002/0015545 A1, from which FIG. 1 of the appended drawings was extracted.

In the description and in the claims which follow, terms such as "inner" or "outer", "axial" or "radial" should be understood as referring to the condition fitted onto a motor vehicle.

With reference to FIG. 1, a first-generation hub and bearing unit for a vehicle wheel assembly includes a radially outer annular hub 10 and a bearing 11. The hub 10 has an outer radial flange 12, with a plurality of axial holes 13 formed therein for fixing a wheel to a vehicle, and an axial cylindrical seat with the bearing 11 mounted therein.

The bearing 11 includes two rings of rolling elements 15a and 15b, in this example taper rollers, interposed radially between a pair of radially inner rings or half-rings 16a and 16b and a radially outer ring 17. The non-rotating inner rings 16a and 16b of the bearing 11 are locked against rotation onto the wheel shaft (not shown), while the outer ring 17 is housed in the cylindrical seat 14 in the hub for rotation therewith. The seat 14 extends between two radial surfaces 18 and 19, facing inwardly and outwardly of the vehicle respectively.

The outer ring 17 of the bearing 11 includes a main, central annular portion 20 in which the raceways for the rolling elements 15a and 15b are formed. The outer ring 17 has an outer cylindrical surface 21 for fitting into the cylindrical seat 14 in the hub 10. The dimensions of the cylindrical seat 14 and the cylindrical surface 21 are such that a certain amount of radial interference is involved, requiring the bearing to be force-fitted into the hub, and thereby improving the axial and circumferential locking of the outer ring of the bearing in the hub.

The outer cylindrical surface 21 extends over the entire axial dimension of the outer ring 17 and the axial width thereof is greater than that of the seat 14. The two axially opposite ends of the main, central portion 20 of the outer ring 17 have respective annular formations 22 and 23, formed by cold deformation, usually by rolling, in such a way that they project axially beyond the lateral surfaces 18 and 19 of the annular hub 10 and can be bent radially outwards against these opposite lateral surfaces in order to lock the ring 17 to the hub 10.

In an alternative embodiment of a hub and bearing unit described in the aforesaid U.S. patent application, the outer ring 17 of the bearing 11 has only one tubular projection 22 which extends axially on the axially inward side of the ring, while the axially outward side has an axial shoulder bearing against the lateral surface 19 of the hub.

According to this prior art, a brake rotor (not shown in FIG. 1) is fitted on the hub 10 by bolts screwed into axial threaded holes 24 in the hub 10.

The present invention also relates to a hub and brake rotor assembly in which the brake rotor is coupled to the hub by cold-deformation, by rolling for example. An assembly of this type is described in European Patent EP-B-0 783 980, from which FIG. 2 of the appended drawings was extracted.

With reference to FIG. 2, in which components or elements identical or similar to those of FIG. 1 have been given the same reference numerals, a hub and bearing assembly of the so-called second generation type includes an annular hub 10 with an external radial flange 12 with axial holes 13 for fixing a wheel 25 to the vehicle.

A brake rotor 26, such as a disc or a drum, has an inner radial flange 27, arranged in the same radial plane as the flange 12 of the hub 10 so as to be fixed directly to the periphery thereof. The brake rotor 26 is coupled for rotation with the hub 10 by radial interference between the two external cylindrical surfaces 12a and 27a on the radial flanges 12 and 27 respectively of the two elements, and is locked axially on the hub 10 between a shoulder 28 and a rolled edge 29, formed at the axially outward and inward ends respectively of the surface 12a of the hub.

Equivalent embodiments (which are not illustrated here since they are easy to work out from the above description with reference to FIG. 2) provide for an additional rolled edge at the axially outer end of the cylindrical surface 12a of the flange 12, instead of the shoulder 28, or for the edge or edges to be rolled not on the hub flange 12 but on the flange 27 of the brake rotor. Furthermore, in order to improve the coupling between the hub 10 and the rotor 26, another proposal is for a toothed coupling to be formed between the cylindrical surfaces 12a and 27a of the two elements.

The object of the invention is to provide a hub and brake rotor assembly which improves on the prior art, which can be manufactured at a lower cost, which is easy and rapid to assemble and which ensures improved and more reliable operation.

This object is fully achieved by providing a hub and brake rotor assembly as defined in claim 1.

Characteristics and advantages of the invention will become apparent from the description which follows, provided purely by way of non-limitative example, with reference to the appended drawings, in which:

FIGS. 1 and 2 are axially sectioned views of two hub and brake rotor assemblies of the prior art; and FIG. 3 is an axially sectioned view of a hub and brake rotor assembly according to the invention.

With reference to FIG. 3, those components and elements which are identical or similar to those of FIGS. 1 and 2, have been given the same reference numerals. A hub and brake rotor assembly according to the present invention essentially includes:

a first generation hub and bearing unit of a type in which a bearing 16 with a double set of rolling elements (balls in this case), is fitted into an axial cylindrical seat 14 in an annular hub 10; an outer ring 17 of the bearing 11 is fixed for rotation with the hub 10 by radial interference with the inner cylindrical surface of the seat 14, and is locked axially onto the hub 10 between a pair of annular rims 22 and 23, formed by cold plastic deformation, preferably by rolling, and which extend radially outwardly from an outer cylindrical surface 21 of the ring 17 of the bearing so as to engage axially opposite radial surfaces 18 and 19 (inner and outer respectively) of the hub 10; and a brake rotor 26, such as a disc (as in the case illustrated in FIG. 3) or a drum, an inner radial flange 27 of which is arranged substantially in the same radial plane as the flange 12 of the hub 10; the brake rotor 26 is coupled for rotation with the hub 10 by radial interference between the outer cylindrical surfaces 12a and 27a of the radial flanges 12 and 27 respectively, and is locked axially onto the hub 10 between a shoulder 28 and a rolled edge 29, these both being formed at the axially inner and outer edges respectively of the surface 12a of the flange 12 so as to engage opposite radial surfaces 30 and 31 respectively of the flange 27.

Anything not expressly illustrated in detail can be referred to in the earlier description relating to the prior art.

The hub and brake rotor assembly of the invention also provides for alternative embodiments (not shown), which differ from that described above by the means for fixing the hub 10 to the outer ring 17 of the bearing 11 and/or for fixing the brake rotor 26 to the flange 12 of the hub 10. With regard to the first connection, it is possible to form only one of the two annular rims 22, 23 of the hub 10 by cold deformation, replacing the other with a shoulder formed in one piece with the flange 12 of the hub. On the other hand, with regard to fixing the brake rotor 26 to the hub 10, it is possible to lock both sides of the flange 27 of the rotor onto the flange 12 of the hub by means of annular rims formed by rolling.

In addition, the scope of the invention also includes an embodiment where, in order to lock the hub 10 axially onto the bearing 11, one or more rolled edges are formed on the hub rather than on the outer ring 17 of the bearing and another in which, in order to lock the brake rotor 26 axially on the hub 10, one or more rolled edges are provided on the rotor rather than on the hub. Finally, in order to ensure that braking torque is transmitted from the rotor 26 to the hub 10, it is possible to form a toothed or grooved coupling between the flanges 27 and 12.

A hub and rotor assembly according to the invention is made up of a small number of parts, thanks to the fact that the fixings securing the brake rotor to the hub and the hub to the bearing are formed by rolling and not by threaded fixing means, as in the prior art. This makes it easier to manage the components needing to be assembled during a manufacturing cycle. In addition, in the case of large-scale production, such as that intended for the automobile industry, fixing by rolling proves more economical compared to the conventional method of threaded connection.

A further advantage provided by the invention consists in the fact that, since the coupling surfaces between the brake rotor and the hub (constituted essentially by the cylindrical surfaces 12a and 27a of the flanges 12 and 27) are smaller than they are when the rotor is coupled to the flange by bolts, the rotor transmits less heat to the bearing-hub unit, which thus operates in more favorable thermal conditions.

In addition, the flange of the brake rotor can be of smaller dimensions than those the prior art, thus saving on material which involves a reduction in the overall weight of the wheel assembly as well as into lower manufacturing costs for the brake rotor.

The rolled coupling between the brake rotor and the hub also means the axial dimensions of the wheel assembly can be kept down, allowing for greater flexibility in applying the assembly in different lay-outs.

What is claimed is:

1. A hub and brake rotor assembly for a vehicle wheel, the assembly including:

a radially outer annular hub for coupling to a wheel, the radially outer annular hub including an axially central cylindrical seat constructed to house a bearing, the radially outer annular hub forming a radially outer flange constructed to fix a brake rotor, wherein the axially central cylindrical seat has an inner cylindrical surface and the radially outer flange has an outer cylindrical surface;

a bearing having an outer ring inserted in the inner cylindrical surface of the axially central cylindrical seat of the radially outer annular hub for rotation therewith; and a brake rotor having an inner radial flange arranged substantially in the same radial plane as the radially outer flange of the radially outer annular hub;

wherein the outer ring of the bearing is coupled for rotation with the radially outer annular hub as a result of radial interference between an outer cylindrical surface of the outer ring of the bearing and the inner cylindrical surface of the axially central cylindrical seat, and wherein the outer ring is locked axially on the radially outer annular hub by at least one annular rim obtained by cold deformation and extending radially outwardly from the outer bearing ring for engaging one or two opposite radial surfaces of the radially outer annular hub; and wherein the brake rotor is locked axially on the radially outer flange of the radially outer annular hub by at least one further annular rim obtained by cold deformation that projects radially outwards from the outer cylindrical surface of the radially outer flange of the radially outer annular hub for engaging one of two opposite radial surfaces of the inner radial flange of the brake rotor.

2. The assembly of claim 1, wherein said at least one annular rim for axially locking the outer ring of the bearing on the hub, is formed on said outer ring.

3. The assembly of claim 2, wherein the said at least one annular rim for axially locking the outer ring of the bearing on the hub projects axially outwardly from the cylindrical surface of the outer ring so as to engage one of two opposite radial surfaces of the hub.

4. The assembly of claim 3, including two annular rims obtained by cold deformation and projecting radially outwardly from the cylindrical surface so as to engage the two radial surfaces of the hub.

5. The assembly of claim 1, wherein the said at least one annular rim for axially locking the brake rotor on the hub is formed on the hub.

6. An assembly of claim 5, wherein the said at least one annular rim for axially locking the brake rotor on the hub projects radially outwardly from a cylindrical surface of the flange of the hub so as to engage one of two opposite radial surfaces of the flange of the rotor.

7. The assembly of claim 6, including:

an annular rim obtained by cold deformation and projecting radially outwardly from an outer cylindrical surface of the radially outer flange on the hub to engage a radial face of a flange of the brake rotor; and a shoulder projecting radially from the opposite axial end of the cylindrical surface to engage the radial surface of the flange.

8. The assembly of claim 1, wherein the brake rotor is mounted on the hub with radial interference between a outer cylindrical surface of the radially outer flange on the rotor and a cylindrical surface of the radially outer flange on the hub.

9. The wheel assembly according to claim 1, wherein the brake rotor is fixed against rotation on the hub by means of a toothed or grooved coupling respective radial flanges.

* * * * *